United States Patent
Okada et al.

(10) Patent No.: US 7,641,022 B2
(45) Date of Patent: Jan. 5, 2010

(54) MOTOR-DRIVEN POWER STEERING UNIT SUPPORT STRUCTURE

(75) Inventors: Megumu Okada, Saitama (JP); Keita Yagi, Saitama (JP); Yotaro Mori, Saitama (JP); Takeshi Wakabayashi, Saitama (JP); Kihoko Kaita, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 201 days.

(21) Appl. No.: 11/528,430

(22) Filed: Sep. 28, 2006

(65) Prior Publication Data

US 2007/0095601 A1 May 3, 2007

(30) Foreign Application Priority Data

Sep. 30, 2005 (JP) ............................. 2005-288226

(51) Int. Cl.
*B62K 11/02* (2006.01)

(52) U.S. Cl. ...................................................... 180/444

(58) Field of Classification Search ................. 180/444, 180/443
See application file for complete search history.

(56) References Cited

U.S. PATENT DOCUMENTS

| | | | | |
|---|---|---|---|---|
| 5,855,250 A | * | 1/1999 | Nishi | 180/312 |
| 6,702,058 B2 | * | 3/2004 | Ishii et al. | 180/311 |
| 6,834,734 B2 | * | 12/2004 | Wu | 180/65.5 |
| 6,966,399 B2 | * | 11/2005 | Tanigaki et al. | 180/444 |
| 7,182,169 B2 | * | 2/2007 | Suzuki | 180/426 |
| 7,357,418 B2 | * | 4/2008 | Takahashi | 280/779 |
| 7,380,622 B2 | * | 6/2008 | Shimizu | 180/68.1 |
| 7,441,475 B2 | * | 10/2008 | Eberhart et al. | 74/388 PS |
| 2004/0099470 A1 | | 5/2004 | Tanigaki et al. | |
| 2005/0257989 A1 | * | 11/2005 | Iwami et al. | 180/443 |
| 2006/0219452 A1 | * | 10/2006 | Okada et al. | 180/68.5 |
| 2006/0219469 A1 | * | 10/2006 | Okada et al. | 180/443 |
| 2007/0007758 A1 | * | 1/2007 | Maeda et al. | 280/788 |
| 2007/0074927 A1 | * | 4/2007 | Okada et al. | 180/421 |

FOREIGN PATENT DOCUMENTS

JP 2663454 B2 6/1997

* cited by examiner

*Primary Examiner*—Tony H. Winner
(74) *Attorney, Agent, or Firm*—Birch, Stewart, Kolasch & Birch, LLP (57) ABSTRACT

To provide a motor-driven power steering unit support structure that can absorb mounting errors of a steering shaft. A vehicle includes a steering shaft rotatably supported on a vehicle body frame. A steering bar handle is attached to the upper end of the steering shaft. A motor-driven power steering unit is mounted onto the lower end of the steering shaft, and the vehicle includes at least two front wheels. The motor-driven power steering unit is supported on the vehicle body frame from the vehicle width direction. A front support member and a rear support member for supporting the motor-driven power steering unit are provided in the vehicle body frame on the front and rear sides, with the steering shaft therebetween.

14 Claims, 7 Drawing Sheets

MOTOR-DRIVEN POWER STEERING UNIT SUPPORT STRUCTURE

CROSS-REFERENCE TO RELATED APPLICATIONS

This nonprovisional application claims priority under 35 U.S.C. § 119(a) on Patent Application No. 2005-288226, filed in Japan on Sep. 30, 2005, the entirety of which is incorporated herein by reference.

BACKGROUND OF THE INVENTION

1. Field of the Invention

The present invention relates to an improvement in a motor-driven power steering unit support structure.

2. Description of Background Art

A motor-driven power steering unit support structure according to the background art is known, wherein a motor-driven power steering device is supported by brackets attached to a vehicle body frame (see, for example, Japanese Patent No. 2663454).

FIGS. 2 and 3 in Japanese Patent No. 2663454 show that a steering shaft 7 is supported by an upper-side frame pipe 101 and a lower-side frame pipe 102 which constitute a vehicle body frame 1. The steering shaft 7 is divided into an upper side 7a and a lower side 7b. A motor-driven power steering device 8 is interposed between the upper side 7a and the lower side 7b. The power steering device 8 is mounted onto the upper-side frame pipe 101 through brackets 9. With the above construction, the motor-driven power steering device 8 is supported in the axial direction of the steering shaft 7.

In the background art, if the steering shaft 7 is supported at two upper and lower positions of the vehicle body frame 1, a mounting error may be generated in mounting the steering shaft 7 due, for example, to production errors in the upper-side frame pipe 101 and the lower-side frame pipe 102 of the vehicle body frame 1. The error is, for example, an error in a direction orthogonal to the steering shaft 7.

Therefore, even in the case where the mounting error in mounting the brackets 9 onto the upper-side frame pipe 101 is small, the error present between the motor-driven power steering device 8 and the brackets 9 in a direction orthogonal to the steering shaft 7 is difficult to absorb at the time of supporting the motor-driven power steering device 8 by the brackets 9 in the axial direction of the steering shaft 7.

In addition, the motor-driven power steering device 8 is supported by the left and right brackets 9, 9. Therefore, the motor-driven power steering device 8 can be firmly supported against external forces exerted thereon in the vehicle width direction. However, the motor-driven power steering device 8 is liable to be displaced by an inertial force in the front-rear direction generated in the motor-driven power steering device 8, which is a heavy body, in the case where the vehicle is accelerated or decelerated, for example.

SUMMARY OF THE INVENTION

It is an object of the present invention to provide a motor-driven power steering unit support structure by which the mounting error in mounting a steering shaft can be absorbed and a motor-driven power steering unit can be supported firmly in the vehicle front-rear direction.

According to a first aspect of the present invention, in a vehicle comprising a steering shaft rotatably supported on a vehicle body frame, a steering bar handle attached to the upper end of the steering shaft, a motor-driven power steering unit attached to the lower end of the steering shaft, and at least two front wheels, the motor-driven power steering unit is supported by the vehicle body frame in the vehicle width direction, and support portions for supporting the motor-driven power steering unit are provided in the vehicle body frame on the front and rear sides, with the steering shaft therebetween.

In operation, the motor-driven power steering unit attached to the lower end of the steering shaft extending substantially in the vertical direction is supported in the vehicle width direction substantially orthogonal to the steering shaft. Therefore, the motor-driven power steering unit can be moved in a direction substantially orthogonal to the steering shaft, and it is easy to align the axis of the motor-driven power steering unit to the axis of the steering shaft.

In addition, the support portions are provided in the vehicle body frame on the front and rear sides, with the steering shaft therebetween. Therefore, the motor-driven power steering unit which is a heavy body can be firmly supported with good balance on the front and rear side, as compared, for example, with the case where the vehicle body frame is provided with a support portion at one position.

According to a second aspect of the present invention, the support portions on the front and rear sides are provided in the same frame member or in a sub unit comprised of at least two frame members and a frame member connecting the at least two frame members to each other.

In operation, with the support portions on the front and rear sides provided in the sub unit, in the present invention, the accuracy of the distance between the support members on the front and rear sides is enhanced, as compared, for example, with the case where support members on the front and rear sides are provided separately in two frame members which are provided at remote positions in a vehicle body frame.

According to a third aspect of the present invention, at least one of the support portions on the front and rear sides is located on the vehicle body center side in the frame member or members.

In operation, it is ensured that flying stones, standing trees or the like coming from the outside of the vehicle would not easily collide on the support portions on the front and rear sides. In addition, the motor-driven power steering unit can be protected by the support portions on the front and rear sides.

According to a fourth aspect of the present invention, unit support portions on the power-driven power steering unit side which correspond to the support portions on the front and rear sides are provided in a power assist portion provided in the motor-driven power steering unit.

In operation, the power assist portion is provided with high rigidity in consideration of high torques exerted thereon. Therefore, when the unit support portions are provided in such a high-rigidity power assist portion, it is thereby ensured that the motor-driven power unit is supported more firmly when the unit support portions are attached to the support portions on the front and rear sides.

According to a fifth aspect of the present invention, an upper bearing portion provided on the vehicle body frame side to support the steering shaft and the support portions on the front and rear sides form a roughly isosceles triangle in side view such that a line segment connecting the support portions on the front and rear sides constitutes the base of the triangle and the upper bearing portion constitutes the vertex of the triangle.

In operation, the upper bearing portion and the support portions on the front and rear sides form a roughly isosceles triangle, with the upper bearing portion at the vertex of the triangle, whereby the motor-driven power steering unit is supported stably on the front and rear sides.

According to a sixth aspect of the present invention, the fastening direction of the support portions on the front and rear sides and the fastening direction of the upper bearing portion are set orthogonal to each other.

In operation, the motor-driven power steering unit is firmly supported against external forces exerted in the fastening directions, as compared with the case where the fastening directions of the support portions on the front and rear sides and the fastening direction of the upper bearing portion are parallel to each other, for example.

According to a seventh aspect of the present invention, the support portions on the front and rear sides are located in the vicinity of a lower end portion of the motor-driven power steering unit.

In operation, the weight of the motor-driven power steering unit and torques generated at the motor-driven power unit can be supported assuredly.

According to an eighth aspect of the present invention, at least one of the support portions on the front and rear sides is connected to a motor support portion of the motor-driven power steering unit.

In operation, an electric motor provided in the motor-driven power steering unit is a heavy body and the motor support for supporting such an electric motor is high in rigidity. Therefore, the motor-driven power steering unit can be firmly supported when the high-rigidity motor support portion and the support portions on the front and rear sides are connected to each other.

According to a ninth aspect of the present invention, in a vehicle comprising a steering shaft rotatably supported on a vehicle body frame, a steering bar handle attached to the upper end of the steering shaft, a motor-driven power steering unit attached to the lower end of the steering shaft, and at least two front wheels, support portions for supporting the motor-driven power steering unit are provided in the vehicle front-rear direction on the vehicle body frame side and are disposed on the front and rear sides of the steering shaft.

In operation, with the support portions disposed on the front and rear sides of the steering shaft, the motor-driven power steering unit can be supported firmly in the front-rear direction, and inertial forces in the front-rear direction which are generated in the motor-driven power steering unit when the vehicle is accelerated or decelerated, for example, can be supported.

According to the first aspect of the present invention, the motor-driven power steering unit is supported on the vehicle body frame in the vehicle width direction, and the support portions for supporting the motor-driven power steering unit are provided on the vehicle body frame on the front and rear sides, with the steering shaft therebetween. Therefore, the motor-driven power steering unit is supported in the vehicle width direction which is substantially orthogonal to the steering shaft, so that it is easy to adjust the center of the motor-driven power steering unit, and it is easy to absorb mounting errors of the steering shaft. In addition, the motor-driven power steering unit, which is a heavy body, can be firmly supported with good balance on the front and rear side.

According to the second aspect of the present invention, the support portions on the front and rear sides are provided in the same frame member or in a sub unit composed of at least two frame members and a frame for connecting these frame members. Therefore, the spacing between the support portions on the front and rear sides can be maintained accurately, and the mounting accuracy of the motor-driven power steering unit can be enhanced, and the motor-driven power steering unit can be mounted easily.

According to the third aspect of the present invention, at least one of the support portions on the front and rear sides is disposed on the vehicle body center side of the frame members. Therefore, it is ensured that flying stones, standing trees and the like would not easily come into collision with the support portions on the front and rear sides from the exterior of the vehicle body. In addition, the motor-driven power steering unit can be protected by the support portions on the front and rear sides, and the vehicle's performance of running on bad-conditioned grounds can be enhanced.

According to the fourth aspect of the present invention, the unit support portions on the motor-driven power steering unit side, which correspond to the support portions on the front and rear sides are provided in the power, assist portion of the motor-driven power steering unit. Therefore, when the unit support portions of the power assist portion high in rigidity are attached to the support portions on the front and rear sides, the motor-driven power steering unit can be supported firmly.

According to the fifth aspect of the present invention, the upper bearing portion and the support portions on the front and rear sides form a roughly isosceles triangle with the upper bearing position at the vertex of the triangle, so that the motor-driven power steering unit can be supported stably on the front and rear sides.

According to the sixth aspect of the present invention, the fastening direction of the support portions on the front and rear sides and the fastening direction of the upper bearing portion are set orthogonal to each other, so that the motor-driven power steering unit can be firmly supported against external forces exerted in the fastening directions.

According to the seventh aspect of the present invention, the support portions on the front and rear sides are disposed in the vicinity of a lower end portion of the motor-driven power steering unit. Therefore, the weight of the motor-driven power steering unit and torques generated in the motor-driven power steering unit can be supported assuredly.

According to the eighth aspect of the present invention, at least one of the support portions on the front and rear side is connected to the motor support portion of the motor-driven power steering unit, so that the motor-driven power steering unit can be supported more firmly by the motor support portion and the front and rear support portions which are high in rigidity.

According to the ninth aspect of the present invention, the support portions for supporting the motor-driven power steering unit are provided on the vehicle body frame side in the vehicle body front-rear direction and are disposed on the front and rear sides of the steering shaft. Therefore, the motor-driven power steering unit can be supported firmly in the front-rear direction.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention will now be described with reference to the accompanying drawings. The same reference numerals will be used to identify the same or similar elements throughout the several views. It should be noted that each of the drawings should be viewed in the direction of orientation of the reference numerals.

Figure 1:
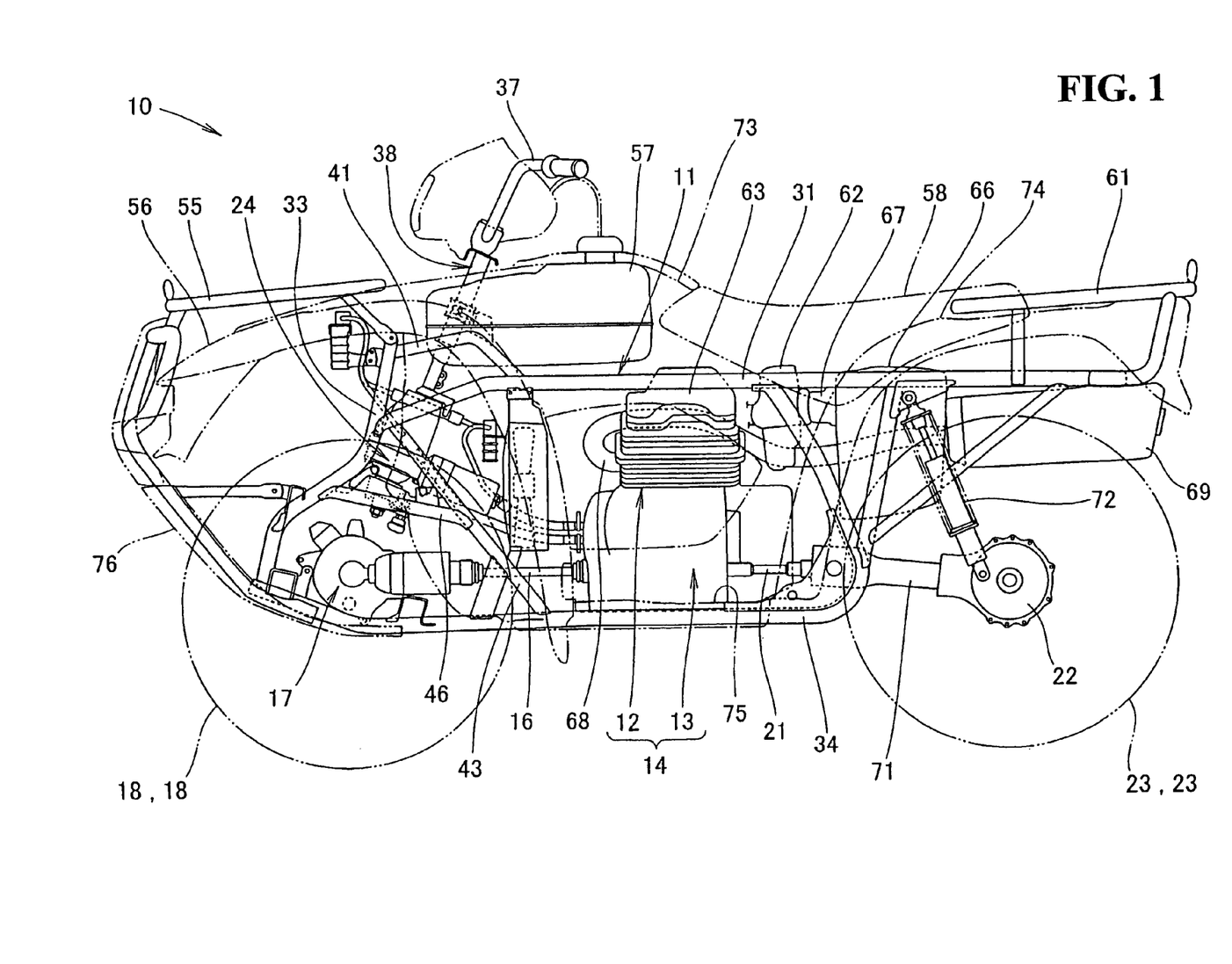
FIG. 1 is a side view of a vehicle configured by adopting a motor-driven power steering unit support structure according to the present invention.

FIG. 1 is a side view of a vehicle configured by adopting a motor-driven power steering unit support structure according to the present invention. An all terrain vehicle 10 as a vehicle is a four-wheel-drive vehicle in which a power unit 14 composed of an engine 12 and a transmission 13 is mounted on a central portion of a vehicle body frame 11. A front final speed reduction gear 17 is connected to a front portion of the transmission 13 through a front propeller shaft 16. Left and right front wheels 18, 18 are connected to the front final speed reduction gear 17 through a drive shaft (not shown). Left and right rear wheels 23, 23 are connected to a rear final speed reduction gear 22 through a drive shaft (not shown). A motor-driven power steering unit 24 for alleviating steering forces for steering the front wheels 18, 18 is also provided.

The vehicle body frame 11 includes a left-right pair of upper main frames 31 and 32 (only symbol 31 on the viewer's side is shown) that extend in the front-rear direction. A front frame 33 has an inverted U shape in front view and is connected respectively to the front ends of the upper main frames 31 and 32. A left-right pair of lower main frames 34 and 36 (only symbol 34 on the viewer's side is shown) is connected respectively to the lower end of the front frame 33 and intermediate portions of the upper main frames 31 and 32. V shaped front upper frames 41 and 42 (only symbol 41 on the viewer's side is shown) that are turned sideways are connected respectively to the upper end of the front frame 33 and the upper main frames 31 and 32 so as to rotatably support an upper portion of a steering shaft 38 fitted with a steering bar handle 37 at the upper end thereof A left-right pair of inclined frames 43 and 44 (only symbol 43 on the viewer's side is shown) extends downwardly rearwards from the front ends of the upper main frames 31 and 32 and is connected to the lower main frames 34 and 36. A left-right pair of sub inclined frames 46 and 47 (only symbol 46 on the viewer's side is shown) is bridgingly connected respectively to intermediate portions of the inclined frames 43 and 44 and the front frame 33 to thereby support a lower portion of the motor-driven power steering unit 24.

Reference numeral 55 identifies a front carrier. Reference numeral 56 identifies a front fender covering the upper and rear sides of the front wheels 18. Reference numeral 57 identifies a fuel tank. Reference numeral 58 identifies a seat. Reference numeral 61 identifies a rear carrier. Reference numeral 62 identifies a carburetor connected to the rear portion side of a cylinder head 63 of the engine 12. Reference numeral 66 identifies an air cleaner connected to the carburetor 62 through a connecting tube 67. Reference numeral 68 identifies an exhaust pipe that extends toward the vehicle rear side from a front portion of the cylinder head 63. Reference numeral 69 is a muffler connected to the rear end of the exhaust pipe 68. Reference numeral 71 identifies a swing arm that supports the rear wheels 23, 23 swingably relative to the lower main frame 34, 36 side. Reference numeral 72, 72 (only symbol 72 on the viewer's side is shown) identifies a left-right pair of rear cushion units bridgingly mounted onto the swing arm 71 and the upper main frame 31, 32 side. Reference numeral 73 identifies a body side cover disposed on the lateral sides of the power unit 14. Reference numeral 74 identifies a rear fender covering the upper and front sides of the rear wheels 23. Reference numeral 75 identifies a step floor. Reference numeral 76 identifies a skid plate covering front lower portions of the left and right lower main frames 34, 36 and the front side of the lower main frames 34, 36.

Figure 2:
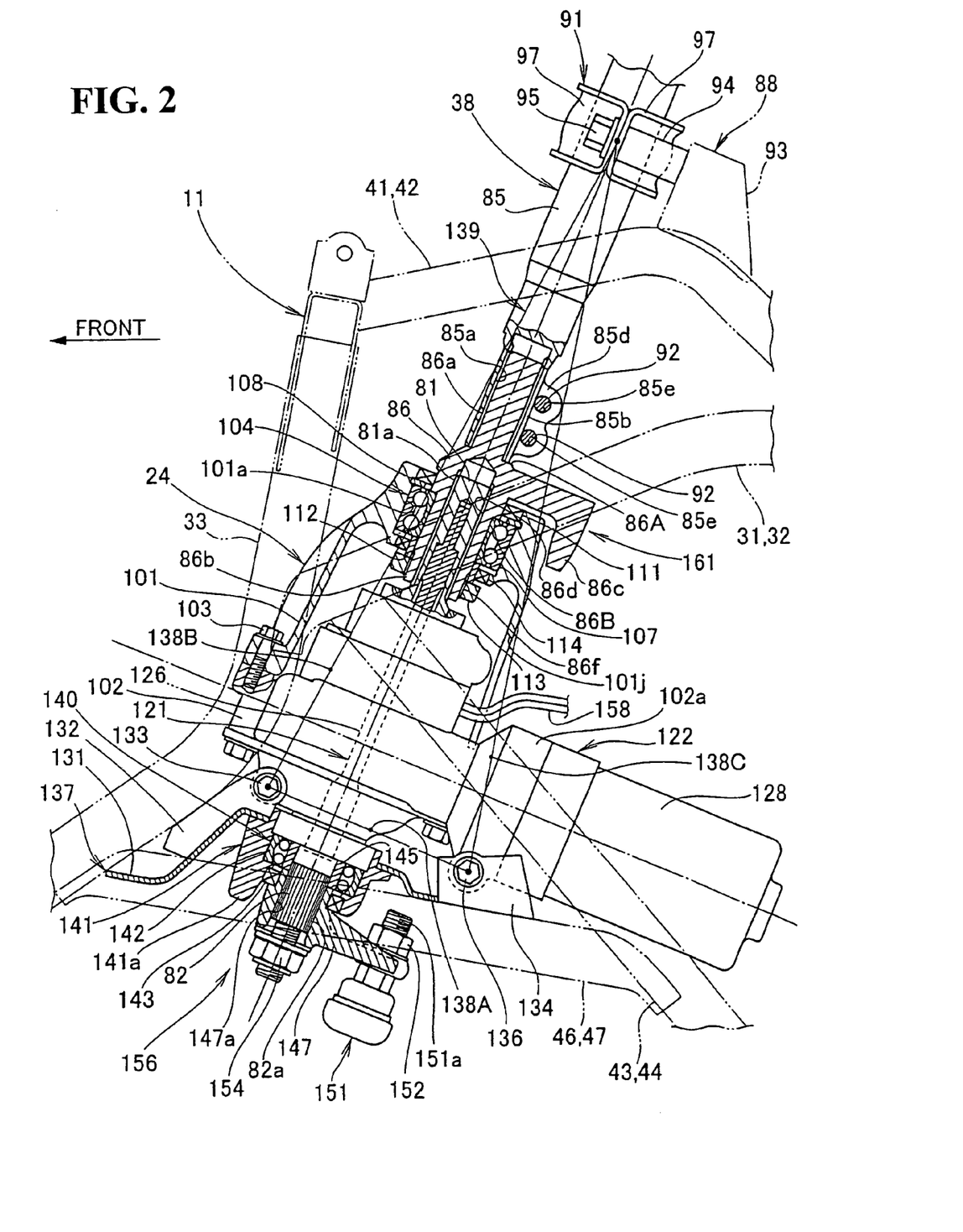
FIG. 2 is a side view of an essential part of the vehicle according to the present invention.

FIG. 2 is a side view of an essential part of the vehicle according to the present invention, showing that an upper portion of the vehicle body frame 11 rotatably supports an intermediate portion of the steering shaft 38. An input shaft 81 provided at an upper portion of the motor-driven power steering unit 24 is connected to the lower end of the steering shaft 38. A lower end portion of the motor-driven power steering unit 24 is mounted onto a lower portion of the vehicle body frame 11. A lower portion of the vehicle body frame 11 rotatably supports an output shaft 82 provided at a lower portion of the motor-driven power steering unit 24.

The steering shaft 38 is composed of an upper shaft 85 with the steering bar handle (handle bar) 37 (see FIG. 1) attached to the upper end thereof A lower shaft 86 has an upper end serration connected to the lower end of the upper shaft 85 and having a lower end serration connected to the input shaft 81.

The upper shaft 85 is a member rotatably mounted, through an upper bearing portion 91, onto a steering support bracket 88 bridgingly attached to the left and right front upper frames 41, 42. The upper shaft 85 is provided at a lower end with a female serration 85a for connection with a male serration 86a provided at the upper end of the lower shaft 86. The upper shaft 85 is provided with an axially extending expanding slot 85b that is in communication with the female serration 85a side and the peripheral surface side. Projected portions 85c and 85d (only symbol 85d on the depth side is shown) are integrally formed respectively at both edge portions of the expanding slot 85b. The projected portions 85c and 85d are provided with bolt insertion holes 85e. Bolts 92 are passed through the bolt insertion holes 85e. Nuts (not shown) are screw engaged with the tip ends of the bolts 92, whereby the lower end of the upper shaft 85 fastens the upper end of the input shaft 81. Incidentally, reference numeral 86A identifies a positioning portion provided in the lower shaft 86 for positioning by abutting the tip end of the upper shaft 85 thereon.

The steering support bracket 88 is composed of a cross member 93 bridgingly connected to the front upper frames 41, 42. Left and right boss portions 94, 94 (only symbol 94 on the viewer's side is shown) are attached to the cross member 93. Bolts 95 are screwed into the boss portions 94, 94, whereby the upper bearing portion 91 is fixed. The upper bearing portion 91 is composed of a bush (not shown) slidably fitted over the upper shaft 85, and a pair of metallic holders 97, 97 for holding the bush.

The lower shaft 86 is provided at a lower portion with a shaft portion 86b, and at an intermediate portion with an L-shaped projected portion 86c that projects rearwards and is L-shaped in section. The shaft portion 86b is provided with a female serration 86d for connection with a male serration 81a formed at the tip end of the input shaft 81.

The motor-driven power steering unit 24 is fitted with a housing 101 covering an upper portion thereof. The housing 101 is a member having a lower portion attached to a gear case 102 of the motor-driven power steering unit 24 by a plurality of bolts 103. An upper portion of the housing 101 rotatably supports the shaft portion 86b of the lower shaft 86 through an intermediate bearing portion 104.

The intermediate bearing portion 104 is composed of a multi-row type upper bearing 107 fitted in a hole 101a that opens in an upper portion of a housing 101 and is fitted over the shaft portion 86b. A stop ring 108 positions one end of the upper bearing 107. A seal member 111 is fitted in one end portion of the hole 101a adjacently to the stop ring 108. A collar 112 is fitted over the shaft portion 86b and abuts on the other end of the upper bearing 107. A nut 113 is screw-engaged with a male screw 86f at the tip end of the shaft portion 86b to thereby press and fix the other end of the upper bearing 107 through the collar 112. Incidentally, reference numeral 86B identifies a positioning portion provided at the shaft portion 86b for positioning by abutting one end of the upper bearing 107 thereon.

The motor-driven power steering unit 24 is composed of the above-mentioned input shaft 81 and output shaft 82. A torque sensor portion 121 detects a steering torque. A power assist portion 122 generates power for assisting a steering force. Based on the steering torque detected by the torque sensor portion 121 and the like, the power assist portion 122 is controlled by a controller (not shown). The torque sensor portion 121 is provided with a torsion bar 126 for connecting the input shaft 81 and the output shaft 82 to each other.

When the input shaft 81 is rotated by an operation of the steering bar handle 37 (see FIG. 1), a relative rotational angle is generated between the input shaft 81 and the output shaft 82, with the result that the torsion bar 126 is twisted. The twisting amount (torsion) is converted into a torque, whereby the steering torque is determined.

The power assist portion 122 is composed of an electric motor 128. A clutch (not shown) and a speed reduction gear (not shown; composed of a worm gear and a worm wheel) are interposed between an output shaft of the electric motor 128 and the output shaft 82.

The motor driven power steering unit 24 has a configuration in which the gear case 102 on the front side relative to the output shaft 82 is attached to a plate-like lower bracket 131 provided on the sub inclined frame 46, 47, through front support members 132 by bolts 133. The gear case 102 on the rear side relative to the output shaft 82 is attached to a rear support member 134 provided on the sub inclined frame 46, 47, by bolts 136. Incidentally, reference numeral 102a identifies a motor support portion provided in the gear case 102 for supporting the electric motor 128 by attaching the electric motor 128 thereto.

The motor-driven power steering unit 24 is a member in which a lower portion of the gear case 102 is supported at two front and rear positions, i.e., by the front support member 132 and the rear support member 134, with the output shaft 82 therebetween.

The left and right sub inclined frames 46, 47 and the lower brackets 131 are members constituting a frame unit 137. In this manner, the same frame unit 137 is provided with the front support member 132 and the rear support member 134, whereby the accuracy of the spacing (distance) between the front support member 132 and the rear support member 134 can be enhanced, the mounting accuracy of the motor-driven power steering unit 24 can be enhanced, and the mounting of the motor-driven power steering unit 24 can be conducted easily.

In FIG. 2, the line segment connecting the bolt 133 on the front support member 132 side and the bolt 136 on the rear support member 134 is identified by reference numeral 138A. In addition, the line segment connecting the center of the upper bearing portion 91 and the bolt 133 is identified by reference numeral 138B. Furthermore, the line segment connecting the center of the upper bearing portion 91 and the bolt 136 is identified by reference numeral 138C. The line segments 138A, 138B and 138C form a triangle 139 such that the upper bearing portion 91 is located at the vertex of the triangle 139 and such that the line segment 138A constitutes the base of the triangle 139. The triangle is a roughly isosceles triangle.

In this way, the upper bearing portion 91, the bolt 133 (corresponding to the position of the front support member 132) and the bolt 136 (corresponding to the position of the rear support member 134) are arranged to form a roughly isosceles triangle. Therefore, the upper bearing portion 91, the front support member 132 and the rear support member 134 are laid out stably on a geometrical basis, and the motor-driven power steering unit 24 can be supported stably.

In addition, the bolt 95 at the upper bearing portion 91 is orthogonal to the bolt 133 on the front support member 132 and the bolt 136 on the rear support member 134, i.e., the fastening direction of the bolt 95 is orthogonal to the fastening direction of the bolts 133 and 136. Therefore, the steering shaft 38 and the motor-driven power steering unit 24 can be firmly supported in the fastening directions (the vehicle front-rear direction and the vehicle width direction).

The controller controls the power assist portion 122, based on the steering torque detected by the torque sensor portion 121, a steering angle detected by a steering angle sensor (not shown), the vehicle velocity of the all-terrain vehicle 10 (see FIG. 1), and the like.

A lower bearing portion 140 for rotatably supporting the output shaft 82 includes a shaft support member 141 attached to a central portion of a lower bracket 131, a natural center adjusting type lower bearing 142 attached to the shaft support member 141 for rotatably supporting the output shaft 82, and a seal member 143 for protecting the lower bearing 142 from dust and the like. Incidentally, reference numeral 145 identifies a collar.

The shaft support member 141 is provided with a lower projected portion 141a that projects to the lower side substantially along the output shaft 82, on the vehicle front side.

Reference numeral 147 identifies a center arm 147, which is provided with a female spline 147a. The female spline 147a is coupled with a male spline 82a formed at a lower end portion of the output shaft 82. Reference numeral 151 identifies a ball joint that is provided at an end portion thereof with a bolt portion 151a attached to a rear portion of the center arm 147 by a nut 152. Reference numeral 154 identifies a nut that is connected with a male screw provided at the tip end of the output shaft 82, whereby the center arm 147 is fixed to the output shaft 82.

The lower projected portion 141 of the shaft support member 141 and the center arm 147 constitute a lower steering handle stopper 156.

Figure 3:
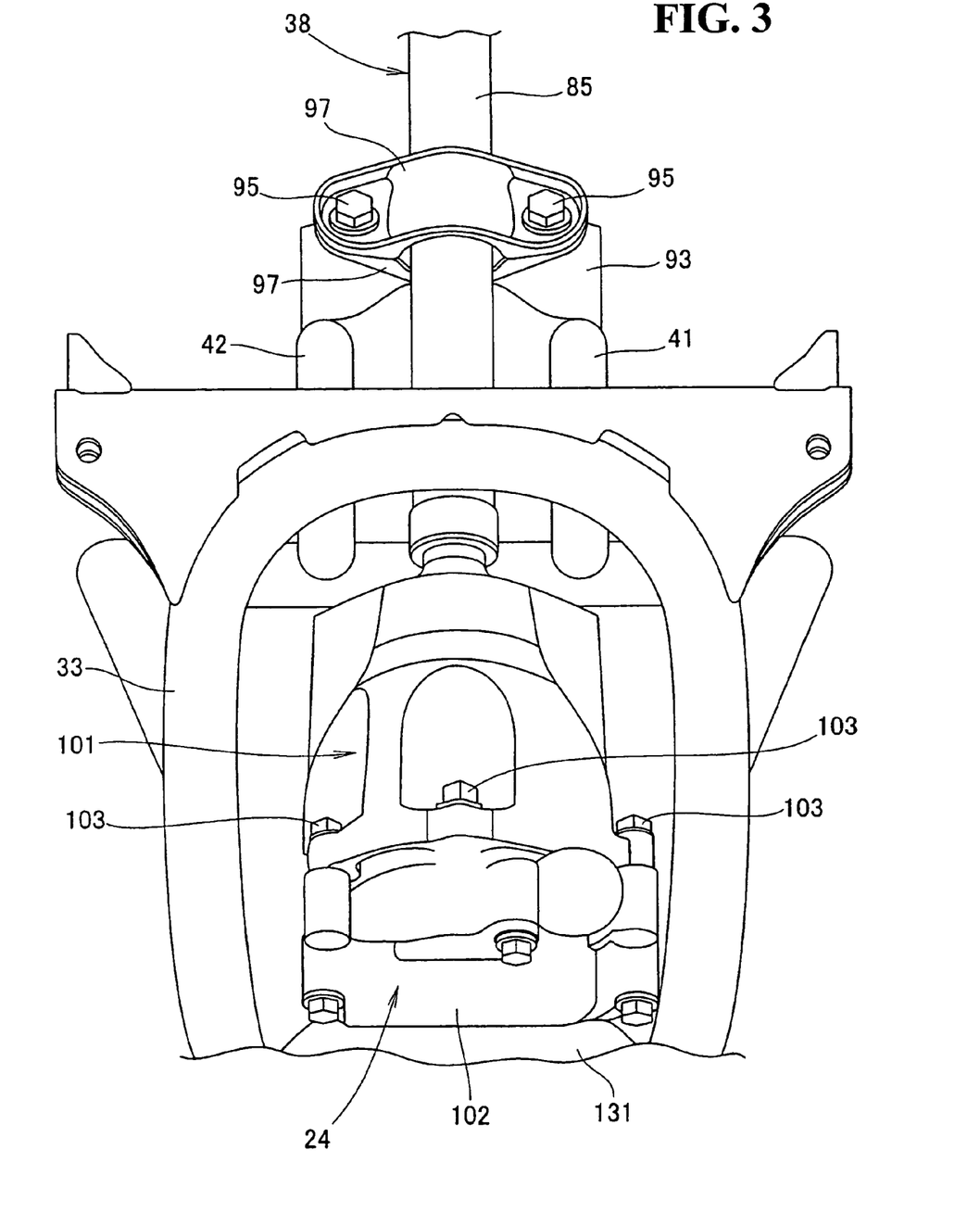
FIG. 3 is a front view of an essential part of the vehicle according to the present invention.

FIG. 3 is a front view of an essential part of the vehicle according to the present invention, showing that the housing 101 is attached to the motor-driven power steering unit 24 by a plurality of bolts 103. The housing 101 covers an upper portion of the motor-driven power steering unit 24. With the upper portion of the motor-driven power steering unit 24 covered by the housing 101, the motor-driven power steering unit 24 can be protected from flying stones, rainwater, dust and the like.

Figure 4:
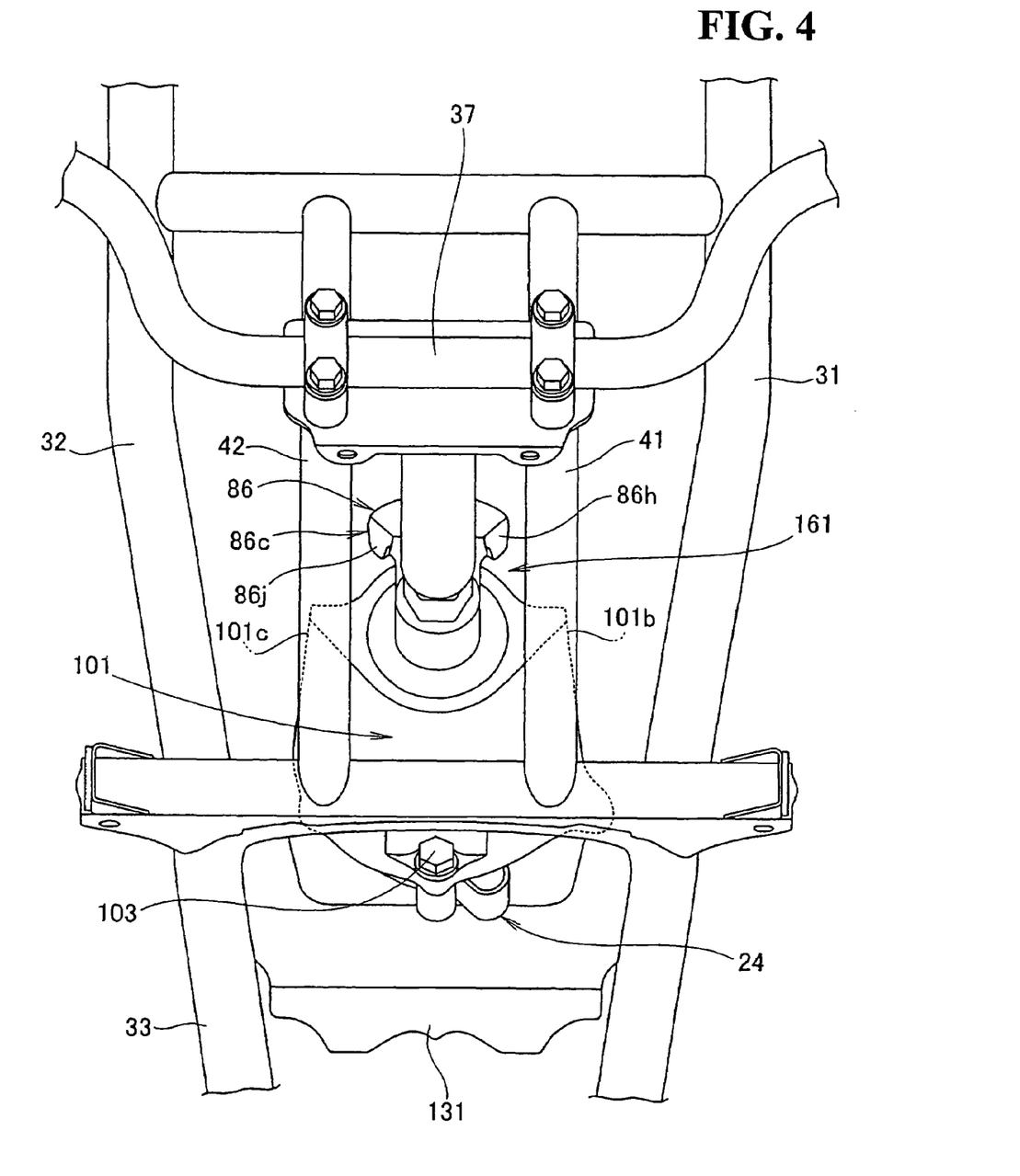
FIG. 4 is a plan view of an essential part of the vehicle according to the present invention.

FIG. 4 is a plan view of an essential part of the vehicle according to the present invention, and shows that an upper portion of the housing 101 and the L-shaped projected portion 86c of the lower shaft 86 that constitute an upper steering handle stopper 161 for restricting the rotational range of the steering bar handle 37.

Figure 5:
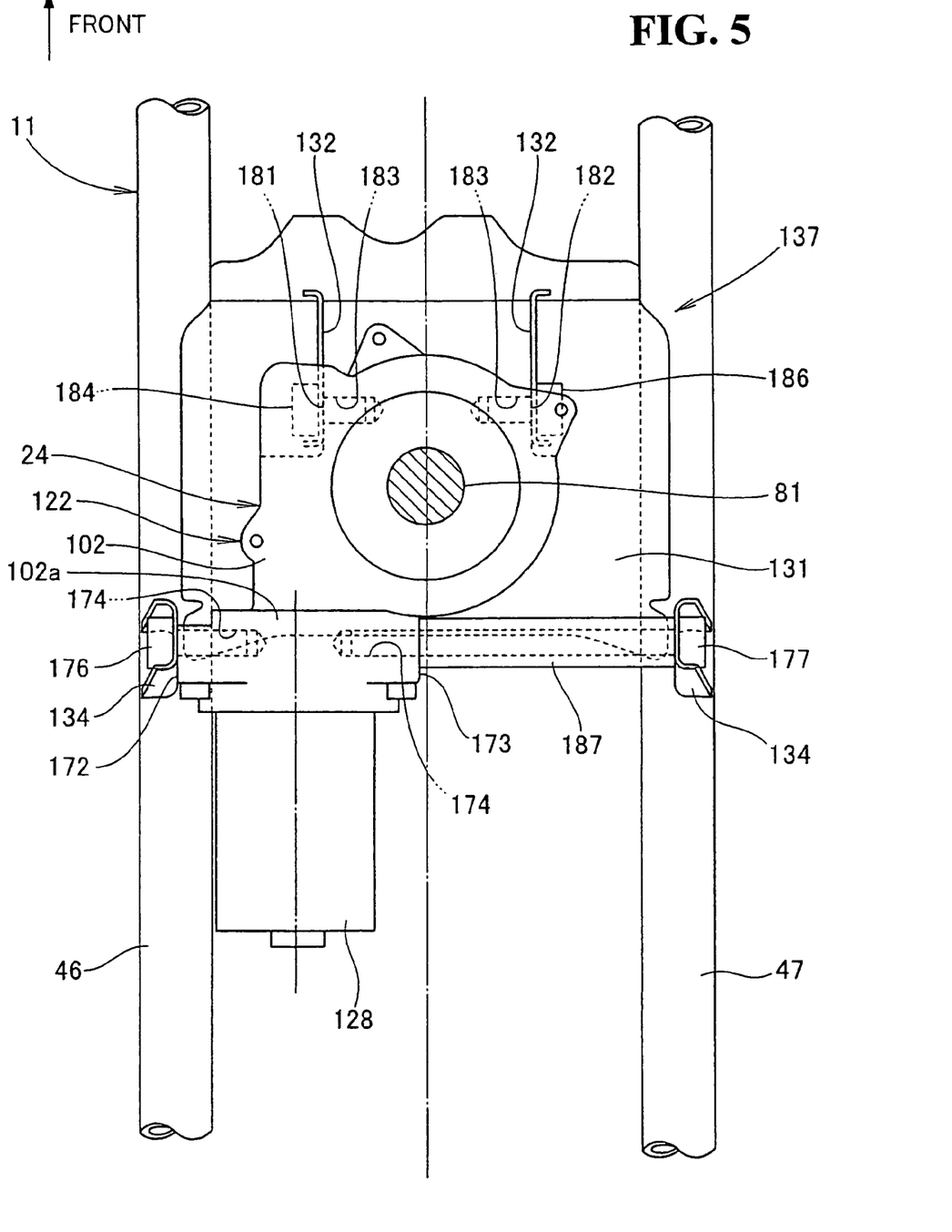
FIG. 5 is an illustration of the motor-driven power steering unit support structure according to the present invention.

FIG. 5 is an illustration of a motor-driven power steering unit support structure according to the present invention, as viewed from the axial direction of the input shaft 81. The power assist portion 122 of the motor-driven power steering unit 24 has a configuration in which female screws 174 are opened in both side surfaces 172 and 173 of the motor support portion 102a provided at a rear portion of the gear case 102. Bolts 176 and 177 are passed through bolt insertion holes (not shown) opened in the left and right rear support members 134, 134 and then screwed into the female screws 174, 174. Female screws 183 are opened in both side surfaces 181 and 182 of a front portion of the gear case 102. Bolts 184 and 186 are passed through bolt insertion holes (not shown) opened in the left and right front support members 132, 132 and then screwed into the female screws 183, 183. Incidentally, reference numeral 187 identifies a tubular collar member interposed between the right-side rear support member 134 and the gear case 102 and disposed to cover the bolt 177.

The front support members 132, 132 are disposed on the vehicle body center side relative to the left and right sub inclined frames 46 and 47. With the front support members 132, 132 thus disposed on the vehicle body center side, it is ensured that flying stones and the like will not easily collide against the front support members 132, 132.

The motor-driven power steering unit 24 is rotatably supported by the intermediate bearing portion 104 and the lower bearing portion 140 at an upper portion and a lower portion thereof, as shown in FIG. 2. Therefore, in FIG. 5, in the condition where the electric motor 128 is not mounted onto the vehicle body frame 11 side, the motor-driven power steering unit 24 is in the state of being freely swingable, with the input shaft 81 and the output shaft 82 (see FIG. 2) as a center.

Accordingly, the motor-driven power steering unit 24 is so mounted onto the vehicle body frame 11 side that the swinging thereof is stopped by the front support member 132 and the rear support member 134 having surfaces substantially orthogonal to the swinging direction, i.e., the motor-driven power steering unit 24 is supported by fastening the bolts 176, 177 and the bolts 184, 186 in the direction substantially orthogonal to the steering shaft 38 (see FIG. 2). Therefore, the axes of the input shaft 81 and the output shaft 82 in the motor-driven power steering unit 24 can be easily aligned with the axis of the steering shaft 38, and the motor-driven power steering unit 24 can be supported rationally.

In addition, the bolts 176, 177 and the bolts 184, 186 extend substantially in the tangential direction with respect to the swinging direction of the motor-driven power steering unit 24. Therefore, the rotational forces generated at the time of operation of the motor-driven power steering unit 24 act on the bolts 176, 177 and the bolts 184, 186 as forces in the tensile or compressive direction, so that these forces can be borne by the bolts 176, 177 and the bolts 184, 186 without any trouble.

Figure 6:
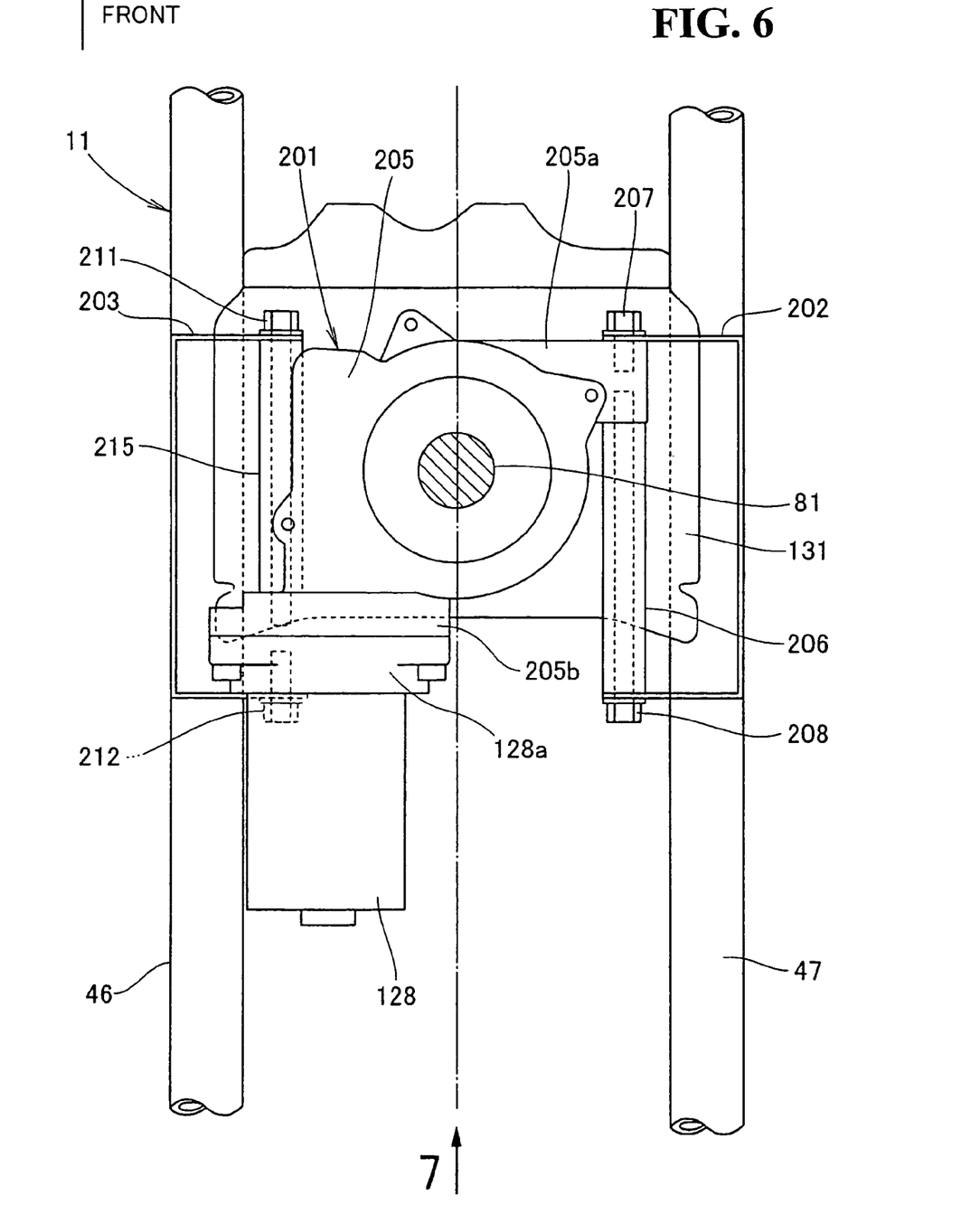
FIG. 6 is an illustration of a motor-driven power steering unit support structure (another embodiment) according to the present invention.

FIG. 6 is an illustration of a motor-driven power steering unit support structure (another embodiment) according to the present invention, as viewed from the axial direction of the input shaft 81. Incidentally, the same configurations as in the embodiment shown in FIG. 5 above are identified by the same reference numerals as used above. A detailed description thereof is therefore omitted.

A motor-driven power steering unit 201 is mounted onto left and right sub inclined frames 46 and 47 by a right support member 202 and a left support member 203 which are composed of U-shaped plates that are laid sideways. To be more specific, the right support member 202 and the left support member 203 are attached to the sub inclined frames 46 and 47 by welding. The collar 206 abuts on the back surface of a front projected portion 205a that projects sideways from a front portion of the gear case 205 of the motor-driven power steering unit 201. A front portion of the front projected portion 205a is attached to a front portion of the right support member 202 by a bolt 207. A rear portion of the front projected portion 205a is attached to a rear portion of the right support member 202 through a collar 206 by a bolt 208. The gear case 205 is provided with a motor support portion 205b. A collar 215 abuts on a front surface of the motor support portion 205b. The motor support portion 205b is attached to a front portion of the left support member 203 through the collar 215 by a bolt 211. A flange portion 128a is attached to a rear portion of the left support member 203 by a bolt 212.

Figure 7:
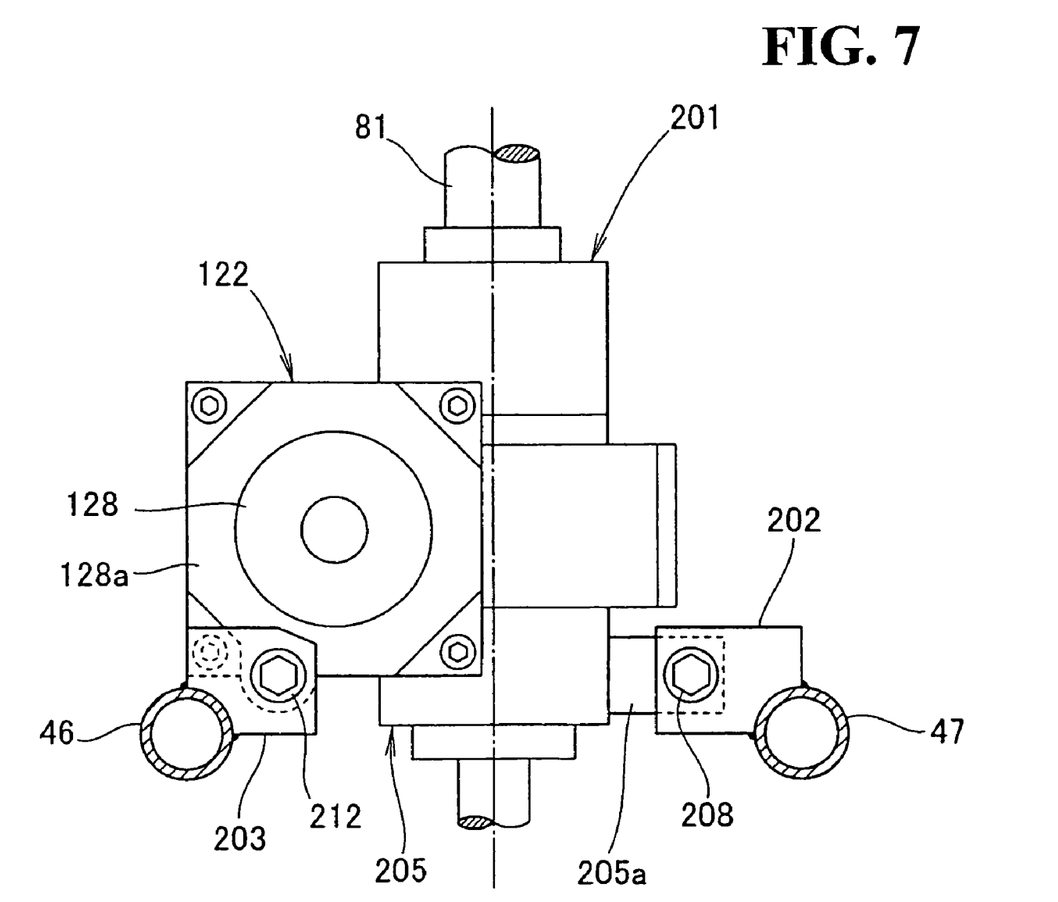
FIG. 7 is a view taken along arrow 7 of FIG. 6.

FIG. 7 is a view in the direction of the arrow 7 of FIG. 6, in which the front support member 202 and the rear support member 203 are connected to lower portions of the power assist portion 122, and are provided in the vicinity of the lower end of the motor-driven power steering unit 201. With the front support member 202 and the rear support member 203 thus connected to lower portions of the power assist portion 122, the motor-driven power steering unit 201 which is a heavy body can be supported stably.

As shown in FIGS. 2 and 5, according to the present invention, in the all-terrain vehicle 10 (see FIG. 1) comprising the steering shaft 38 rotatably supported on the vehicle body frame 11, the steering bar handle 37 (see FIG. 1) attached to the upper end of the steering shaft 38, the motor-driven power steering unit 24 mounted onto the lower end of the steering shaft 38, and at least two front wheels 18 (see FIG. 1), the motor-driven power steering unit 24 is supported on the vehicle body frame 11 in the vehicle width direction, the front support member 132 and the rear support member 134 as support portions for supporting the motor-driven power steering unit 24 are provided in the vehicle body frame 11, specifically at the left and right sub inclined frames 46 and 47 and the lower bracket 131, on the front and rear sides of the steering shaft 38, the input shaft 81 and the output shaft 82, which are disposed on a straight line.

With this configuration, the motor-driven power steering unit 24 is supported in the vehicle width direction substantially orthogonal to the steering shaft 38. Therefore, the center of the motor-driven power steering unit 24 can be easily adjusted to the axis of the steering shaft 38, mounting errors of the steering shaft can be easily absorbed, and the motor-driven power steering unit 24 can be supported rationally. In addition, the motor-driven power steering unit 24, which is a heavy body, can be firmly supported with good balance on the front and rear sides.

According to the present invention, the front support member 132 and the rear support member 134 are provided in the frame unit 137 arranged as a sub unit composed of the sub inclined frames 46 and 47 as two frame members and the lower bracket 131 as a frame member connecting the sub inclined frames 46 and 47. With this configuration, the front support member 132 and the rear frame member 134 are provided in the same frame unit 137 composed of the adjacent frame members, whereby the spacing between the front support member 132 and the rear support member 134 can be accurately maintained, the mounting accuracy of the motor-driven power steering unit 24 can be enhanced, and the mounting of the motor-driven power steering unit 24 can be conducted easily.

According to the present invention, as shown in FIG. 5, at least one of the front support member 132 and the rear support member 134 (here, the front support member 132) is disposed on the vehicle body center side of the sub inclined frames 46 and 47. With this configuration, flying stones, standing trees and the like coming from the exterior of the vehicle body will not easily collide against the front support member 132. In addition, the front support member 132 can protect the motor-driven power steering unit 24, and the all-terrain vehicle's running performance on bad-conditioned grounds can be enhanced.

According to the present invention, as shown in FIG. 5, the side surfaces 172, 173, 181, 182 as unit support portions on the motor-driven power steering unit 24 side that correspond to the front support member 132 and the rear support member 134 are provided in the power assist portion 122 (specifically, the gear case 102 of the power assist portion 122) provided in the motor-driven power steering unit 24. With this configuration, the motor-driven power steering unit 24 can be firmly supported by connection between the side surfaces 172, 173, 181, 182 of the power assist portion 122 being high in rigidity and the front support member 132 and the rear support member 134.

According to the present invention as shown in FIG. 2, the upper bearing portion 91 provided on the vehicle body frame 11 side for supporting the steering shaft 38, together with the front support member 132 and the rear support member 134, forms a roughly isosceles triangle in side view such that the line segment 138A connecting the front support member 132 and the rear support member 134 constitutes the base of the triangle, and the upper bearing 91 is at the vertex of the triangle. With this configuration, the motor-driven power steering unit 24 can be supported stably on the front and rear sides. In addition, moments generated in the motor-driven power steering unit 24 can be supported by the electric motor 128, which is overhanging.

According to the present invention, as shown in FIGS. 2 and 5, the fastening direction of the front support member 132 and the rear support member 134 and the fastening direction of the upper bearing portion 91 are set orthogonal to each other. With this configuration, the motor-driven power steering unit 24 can be supported firmly against external forces exerted in the fastening directions.

According to the present invention, as shown in FIG. 2, the front support member 132 and the rear support member 134 are disposed in the vicinity of a lower end portion of the motor-driven power steering unit 24. With this configuration, the weight of the motor-driven power steering unit 24 and torques generated in the motor-driven power steering unit 24 can be supported assuredly.

According to the present invention, as shown in FIGS. 2 and 5, at least one of the front support member 132 and the rear support member 134 (here, the rear support member 134) is connected to the motor support portion 102a of the motor-driven power steering unit 24. With this configuration, the motor-driven power steering unit 24 can be supported more firmly when the motor support portion 102a being high in rigidity is attached to the rear support member 134.

According to the present invention, as shown in FIG. 2, in the all-terrain vehicle 10 comprising the steering shaft 38 rotatably supported on the vehicle body frame 11, the steering bar handle 37 attached to the upper end of the steering shaft 38, the motor-driven power steering unit 24 mounted onto the lower end of the steering shaft 38, and at least two front wheels 18, the front support member 132 and the rear support member 134 for supporting the motor-driven power steering unit 24 are provided in the vehicle body front-rear direction on the vehicle body frame 11 side, and are disposed on the front and rear sides of the steering shaft 38.

With this configuration, the motor-driven power steering unit 24 can be supported firmly in the front-rear direction.

Incidentally, while the front support members 132, 132 are disposed on the vehicle body center side of the left and right sub inclined frames 46 and 47 as shown in FIG. 5 in this embodiment, the rear support members 134, 134 may be disposed on the vehicle body center side relative to the sub inclined frames 46 and 47. In addition, both the front support members 132, 132 and the rear support members 134, 134 may be disposed on the vehicle body center side of the sub inclined frames 46 and 47.

The motor driven power steering unit support structure according to the present invention is preferable for use in four-wheel vehicles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motor-driven power steering unit support structure for a vehicle, the vehicle including a steering shaft rotatably supported on a vehicle body frame, a steering handle attached to an upper end of said steering shaft, a motor-driven power steering unit attached to a lower end of said steering shaft, and at least two front wheels, said motor-driven power steering unit being supported by said vehicle body frame, said motor-driven power steering unit support structure comprising:

support portions directly supporting said motor-driven power steering unit to said vehicle body frame on front and rear sides of the motor-driven power steering unit, with said steering shaft therebetween, a length dimension of said support portions extending in the vehicle width direction, wherein said support portions include a first pair of support members and a second pair of support members, said first pair of support members supporting a front portion of said motor-driven power steering unit to said vehicle body frame on left and right sides of said motor-driven power steering unit respectively, said second pair of support members supporting a rear portion of said motor-driven power steering unit to said vehicle body frame on left and right sides of said motor-driven power steering unit respectively.

2. The motor-driven power steering unit support structure as set forth in claim 1, wherein said support portions on the front and rear sides are provided in the same frame member or in a sub unit comprised of at least two frame members and a frame member connecting said at least two frame members to each other.

3. The motor-driven power steering unit support structure as set forth in claim 2, wherein at least one of said support portions on the front and rear sides is located on the vehicle body center side in said frame member or members.

4. The motor-driven power steering unit support structure as set forth in claim 2, wherein unit support portions on the power-driven power steering unit side which correspond to said support portions on the front and rear sides are provided in a power assist portion provided in said motor-driven power steering unit.

5. The motor-driven power steering unit support structure as set forth in claim 2, wherein an upper bearing portion provided on the vehicle body frame side to support said steering shaft and said support portions on the front and rear sides form a roughly isosceles triangle in side view such that a line segment connecting said support portions on the front and rear sides constitutes the base of said triangle and said upper bearing portion constitutes the vertex of said triangle.

6. The motor-driven power steering unit support structure as set forth in claim 5, wherein the fastening direction of said support portions on the front and rear sides and the fastening direction of said upper bearing portion are set orthogonal to each other.

7. The motor-driven power steering unit support structure as set forth in claim 2, wherein said support portions on the front and rear sides are located in the vicinity of a lower end portion of said motor-driven power steering unit.

8. The motor-driven power steering unit support structure as set forth in claim 2, wherein at least one of said support portions on the front and rear sides is connected to a motor support portion of said motor-driven power steering unit.

9. The motor-driven power steering unit support structure as set forth in claim 1, wherein unit support portions on the power-driven power steering unit side which correspond to said support portions on the front and rear sides are provided in a power assist portion provided in said motor-driven power steering unit.

10. The motor-driven power steering unit support structure as set forth in claim 1, wherein an upper bearing portion provided on the vehicle body frame side to support said steering shaft and said support portions on the front and rear sides form a roughly isosceles triangle in side view such that a line segment connecting said support portions on the front and rear sides constitutes the base of said triangle and said upper bearing portion constitutes the vertex of said triangle.

11. The motor-driven power steering unit support structure as set forth in claim 10, wherein the fastening direction of said support portions on the front and rear sides and the fastening direction of said upper bearing portion are set orthogonal to each other.

12. The motor-driven power steering unit support structure as set forth in claim 1, wherein said support portions on the front and rear sides are located in the vicinity of a lower end portion of said motor-driven power steering unit.

13. The motor-driven power steering unit support structure as set forth in claim 1, wherein at least one of said support portions on the front and rear sides is connected to a motor support portion of said motor-driven power steering unit.

14. A motor-driven power steering unit support structure for a vehicle, the vehicle including a steering shaft rotatably supported on a vehicle body frame, a steering handle attached to an upper end of said steering shaft, a motor-driven power steering unit attached to a lower end of said steering shaft, and at least two front wheels, said motor-driven power steering unit being supported by said vehicle body frame, said motor-driven power steering unit support structure comprising:

support portions directly supporting said motor-driven power steering unit to said vehicle body frame on front and rear sides of the motor-driven power steering unit, with said steering shaft therebetween, wherein said support portions include a first pair of support members and a second pair of support members, said first pair of support members supporting a front portion of said motor-driven power steering unit to said vehicle body frame on left and right sides of said motor-driven power steering unit respectively, said second pair of support members supporting a rear portion of said motor-driven power steering unit to said vehicle body frame on left and right sides of said motor-driven power steering unit respectively, each length dimension of said first and second pairs of support members extending in the vehicle width direction, or said support portions include a first support member and a second support member, said first support member being mounted to a left frame member of said vehicle body frame and supporting said motor-driven power steering unit to said left frame member, said second support member being mounted to a right frame member of said vehicle body frame and supporting said motor-driven power steering unit to said right frame member, each length dimension of said first and second support members extending in the front-rear direction of the vehicle.

* * * * *